United States Patent

Johnson

[15] 3,664,935
[45] May 23, 1972

[54] EFFLUENT FILTERING PROCESS AND APPARATUS FOR ALUMINUM REDUCTION CELL

[72] Inventor: Arthur F. Johnson, 203 Creole Lane, Franklin Lakes, N.J. 07417

[22] Filed: Jan. 21, 1971

[21] Appl. No.: 108,333

Related U.S. Application Data

[63] Continuation-in-part of Ser. No. 688,578, Dec. 6, 1967, Pat. No. 3,575,827, which is a continuation-in-part of Ser. No. 614,294, Feb. 6, 1967, Pat. No. 3,470,075, which is a continuation-in-part of Ser. No. 607,330, Jan. 4, 1967, Pat. No. 3,434,958, which is a continuation-in-part of Ser. No. 550,653, May 17, 1966, Pat. No. 3,501,386, which is a continuation-in-part of Ser. No. 528,503, Feb. 18, 1966, Pat. No. 3,434,957.

[52] U.S. Cl.................................................204/67, 204/245
[51] Int. Cl.........................................C22d 3/12, C22d 3/02
[58] Field of Search.................................204/67, 243 R–247

[56] References Cited

UNITED STATES PATENTS

| | | | |
|---|---|---|---|
| 3,457,150 | 7/1969 | Vancil et al. | 204/67 |
| 1,839,756 | 1/1932 | Grebe et al. | 204/247 X |
| 3,006,825 | 10/1961 | Sem | 204/245 X |

FOREIGN PATENTS OR APPLICATIONS

| | | | |
|---|---|---|---|
| 613,352 | 1/1961 | Canada | 204/67 |
| 1,007,069 | 4/1957 | Germany | 204/247 |

Primary Examiner—G. L. Kaplin
Assistant Examiner—D. R. Valentine
Attorney—Pennie, Edmonds, Morton, Taylor and Adams

[57] ABSTRACT

The process and apparatus for filtering effluent issuing from a metallurgical furnace by passing the effluent through a sorbent. The furnace may be an aluminum reduction cell with the sorbent being alumina which is being fed to the cell. With an aluminum reduction cell, the effluent is first fed through a bed of alumina which is kept in a fluidized state by the effluent passing therethrough. The effluent from the fluidized bed is then passed through a non-fluidized wall of alumina which further filters the effluent and captures the alumina dust escaping from the fluidized bed. During this filtering, the alumina in the non-fluidized wall with the effluent contained therein is fed to the fluidized bed of alumina. In turn, the alumina in the fluidized bed together with the effluent contained therein is fed back to the cell from which the effluent originally issued.

23 Claims, 4 Drawing Figures

Patented May 23, 1972

INVENTOR
Arthur F. Johnson
BY
ATTORNEYS

Patented May 23, 1972

INVENTOR
Arthur F. Johnson
BY
ATTORNEYS

INVENTOR
Arthur F. Johnson 3,664,935

EFFLUENT FILTERING PROCESS AND APPARATUS FOR ALUMINUM REDUCTION CELL

CROSS-REFERENCE TO RELATED APPLICATIONS

This application is a continuation-in-part of my copending application, Ser. No. 688,578, filed Dec. 6, 1967, now U.S. Pat. No. 3,575,827. My application, Ser. No. 688,578, is, in turn, a continuation-in-part application of application, Ser. No. 614,294, filed Feb. 6, 1967, now U.S. Pat. No. 3,470,075; application, Ser. No. 607,330, filed Jan. 4, 1967, now U.S. Pat. No. 3,434,958; application, Ser. No. 550,653, filed May 17, 1966, now U.S. Pat. No. 3,501,386; and application, Ser. No. 528,503, filed Feb. 18, 1966, now U.S. Pat. No. 3,434,957.

BACKGROUND OF THE INVENTION

With metallurgical furnaces, various procedures have been developed for filtering the effluent issuing from the furnace. In accordance with known procedures, the filtering of the effluent from an aluminum reduction cell may be effected by passing the effluent through alumina; the primary purpose being to capture and remove fluoride and solids from the effluent. In accordance with one known procedure, the effluent is fed through a fluidized bed of alumina. In accordance with another known procedure, the effluent may be fed through stationary permeable bag filters on which alumina is deposited to form a filtering medium.

The fluidized bed and bag type filtering are effective to some extent in ridding the effluent of undesirable pollutants which would otherwise be exhausted to the atmosphere. With today's concern about pollution of the atmosphere, however, these known filtering procedures are not altogether satisfactory. Also, with incomplete filtering of the effluent, the efficiency of the electrolytic reduction process is lowered. This is so since the fluorine values and solids in the effluent which are useable in the electrolytic reduction of aluminum are being lost to the atmosphere.

SUMMARY OF THE INVENTION

In accordance with the teachings of the present invention, the effluent issuing from an aluminum reduction cell is subjected to a double filtering procedure. First, the effluent is filtered through a fluidized bed of alumina and then it is fed through non-fluidized wall of alumina. Both the alumina in the non-fluidized wall and in the fluidized bed with the effluent contained therein is returned to the cell. In feeding the alumina back to the cell, that which makes up the non-fluidized wall is first fed to the fluidized bed of alumina. Also, the effluent issuing from the fluidized bed of alumina may be passed through a heat exchanger for cooling and a portion of the cooled effluent recycled through the fluidized bed before being filtered through the non-fluidized wall of alumina.

For purposes of producing the fluidized bed of alumina, the effluent from the cell is passed through a layer of alumina under a pressure differential effecting fluidization. The fluidized nature of the alumina together with gravity may be relied upon for feeding the alumina through the filtering system.

With applicant's filtering system, the effluent is subjected to a physico-chemical filtering which efficiently removes the fluorine values and solid particles from the effluent and returns them to the cell from which they issued. The physico-chemical nature of the filtering is accentuated by the separate double filtering of the effluent. As the effluent passes through the fluidized alumina, the effluent is hot since as it has just issued from the cell. This phase of the filtering is primarily of a chemical nature with the fluidized particles of the alumina generally reacting chemically with the effluent. Subsequent filtering through the non-fluidized layers of alumina is at a lower temperature than through the first filtering phase and is more of a physical rather than a chemical nature. Here, the layer of alumina particles functions to further remove fluorine values and solids from the effluent; but in addition, this layer functions to capture alumina dust escaping from the fluidized bed of alumina.

DESCRIPTION OF THE PREFERRED EMBODIMENTS

Figure 1:
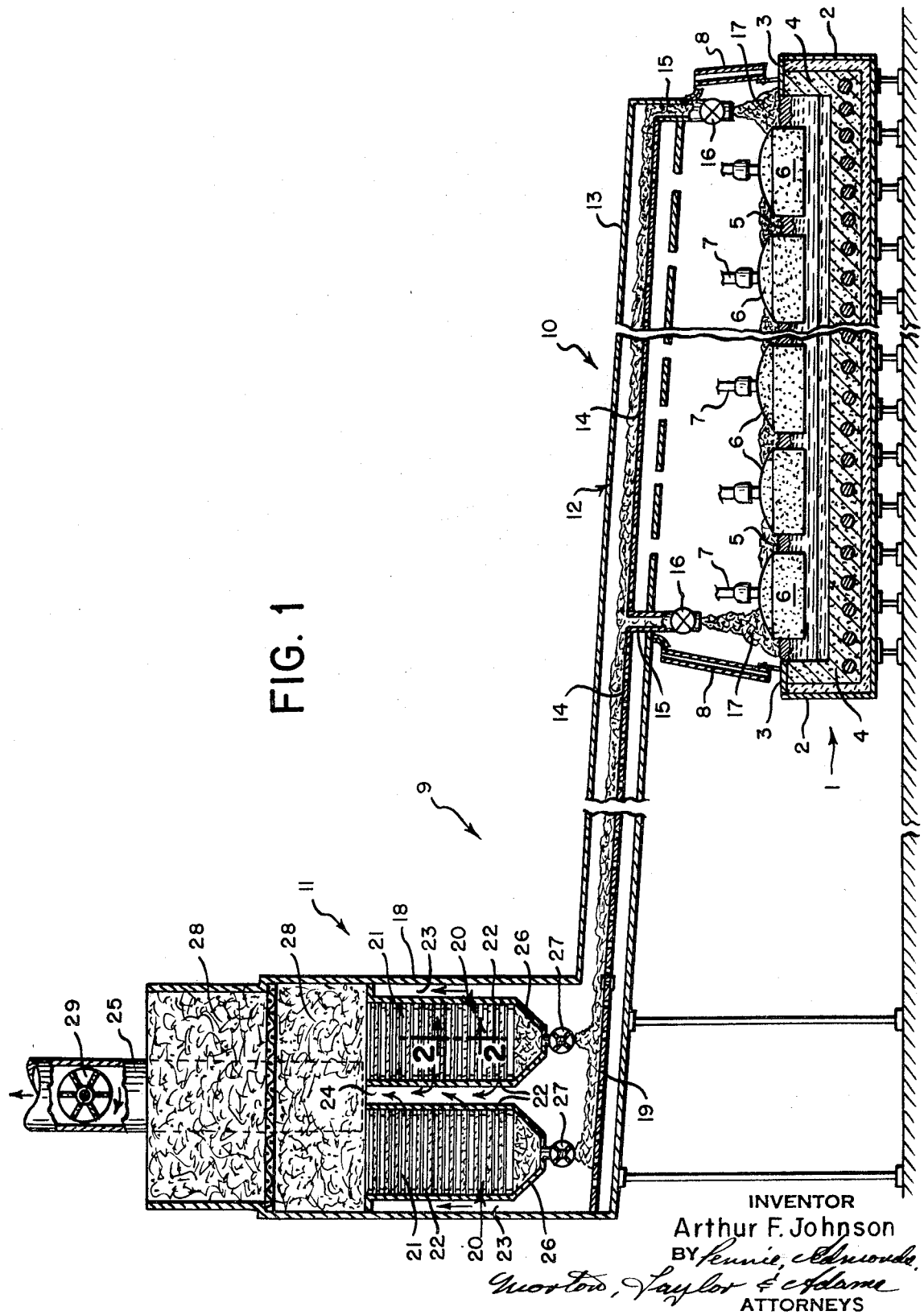
FIG. 1 is a side elevational view of the filtering system of the present invention.
Figure 2:
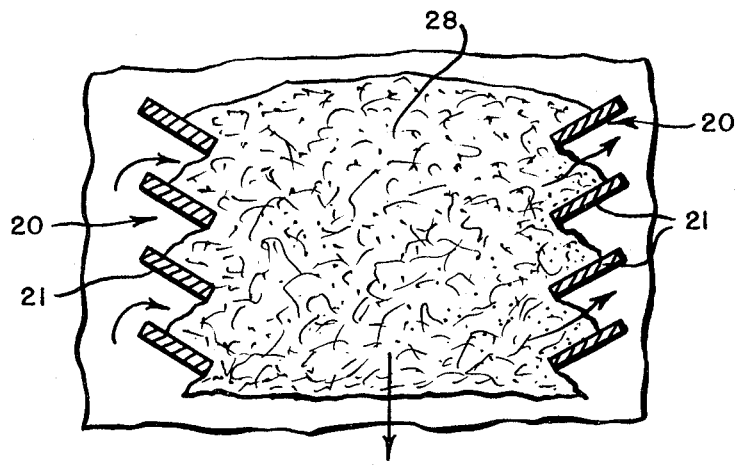
FIG. 2 is an enlarged fragmentary vertical view of a pair of baffled walls taken at 2—2 of FIG. 1.

FIG. 1 shows one embodiment of the present invention in which the effluent from the cell is first passed through a closed air-slide conveyor duct containing a fluidized bed of alumina and then through an additional filtering section comprised of a non-fluidized wall of alumina.

With reference to FIG. 1, the filtering apparatus of the present invention is shown as attached to an aluminum reduction cell 1. The cell itself comprises a steel shell 2 and deck plate 3 enclosing the carbonaceous pot-lining 4. The lining, in turn, contains the molten fusion being electrolyzed. The fusion is frozen on its upper surface to a crust 5 in which anodes 6 are suspended by anode rods 7 which conduct current into the fusion to electrolyze the alumina to molten aluminum.

The filtering apparatus of the present invention as shown in FIG. 1 is attached to the cell 1 by the hood structure 8 which functions to collect the effluent issuing from the cell. The hood 8 effectively seals the filtering apparatus of the present invention to the cell. The connection of the hood to the cell need now, however, be too tight as some infiltration of air into the hood mixing with the hot effluent can be beneficial.

The filtering apparatus, generally designated by reference numeral 9 in FIG. 1, includes two filtering sections 10 and 11 through which the effluent from the cell passes. Section 10, which first receives the effluent from the cell, is comprised of a bed of fluidized alumina. Section 11, which is located remotely of the cell, receives the effluent after it passes through section 10. The filtering in section 11 is produced by passing the effluent through vertical walls of non-fluidized alumina.

In construction, the filtering section 10 includes a support means in the form of a closed air-slide conveyor duct 12 for carrying a bed of fluidized alumina. The conveyor is constructed of an outer steel shell 13 of circular or rectangular cross section and a pervious support member 14 spaced within the shell and adapted to support the fluidized bed of alumina thereon. In the area above the cell, the bottom side of the duct is provided with a plurality of apertures 13' through which the effluent collected by the hood passes. The effluent within the duct then proceeds upwardly through the pervious support member 14 and the alumina lying thereon.

Suction means, more fully described below, is provided for maintaining the duct under reduced pressure to cause the effluent, diluted by air infitrating the hood seals, to be sucted through the duct in a direction away from the cell at a rate sufficient to cause fluidization of the alumina on the pervious support member 14. The end of the duct remote from the cell is connected to the bottom of the filtering section 11; and in accordance with the teachings of the present invention, the duct is sloped at an angle of about 2° as it extends from the filtering section 11 to the cell 1. This sloping of the duct is sufficient to cause the alumina as received from the filtering section 11 to flow by gravity in the fluidized bed toward the cell and in a direction counter to the flow of effluent through the duct. For purposes of feeding this alumina into the cell, one or more overflow conduits 15 are provided. These overflow conduits extend through the fluidized bed and receive alumina as the latter flows along the support 14. The bottom ends of the overflow conduits are provided with suitable regulating means 16 for controlling the flow of alumina from the fluidized bed to the cell. As shown in FIG. 1, the alumina 17 which is fed to the cell from the fluidized bed rests on the crust 5 adjacent the anodes.

The filtering section 11 to which the effluent is fed after filtering through the fluidized bed includes an enclosure 18 connected at its bottom to the conveyor duct 12. A pervious support member 19 is disposed in the bottom of the enclosure to form an extension of the pervious support member 14 and to receive some of the fluidized alumina thereon. Also, contained within the enclosure 18 is a filtering structure for supporting spaced walls of alumina.

In construction, the filtering structure of the filtering section 11 is the same as that disclosed in applicatn's U.S. Pat. No. 3,470,075 and includes several pairs of vertical walls 20 made of baffled steel plates 21. Each pair of walls 20 confines therebetween a vertical wall or layer of alumina. The baffled walls 21 are, themselves, mounted between upright steel walls 22 which are supported by the wall structure of the enclosure 18. The walls 22 are provided with openings 22' for permitting the passage of effluent therethrough. In particular, the effluent, rising up from the fluidized bed of alumina enters at the bottom of the enclosure and passes into the spaces 23. The effluent then passes through the vertical layers of alumina contained between the walls 22 and into the central space 24. From the space 24, the effluent is finally directed into the exhaust duct 25.

The duct 25 which receives the effluent from the filtering section 11 contains a suitable induced draft fan 29. The fan is used for drawing the effluent through the filtering section 11 and is also relied upon for producing the pressure differential necessary to fluidize the bed of alumina contained in the filtering section 10. By placing the fan on the downstream side of the filtering apparatus, it operates on filtered effluent and is less subject to wear from abrasive alumina dust than would be the case if a blower fan were used and located on the upstream side of the filtering apparatus.

Hoppers 26 are disposed at the bottom of the filtering walls 20-22 for receiving alumina from the confined layers after it has performed its filtering function. Regulating means in the form of feed valves 27 are, in turn, mounted at the bottom of the hoppers 26 for feeding alumina from the hoppers to the fluidized bed on the underlying support 19.

A supply 28 of alumina is disposed above the layers of alumina contained in the filtering section 11 for continuously or intermittently replenishing the layers as alumina is fed to the underlying support 19.

Figure 3:
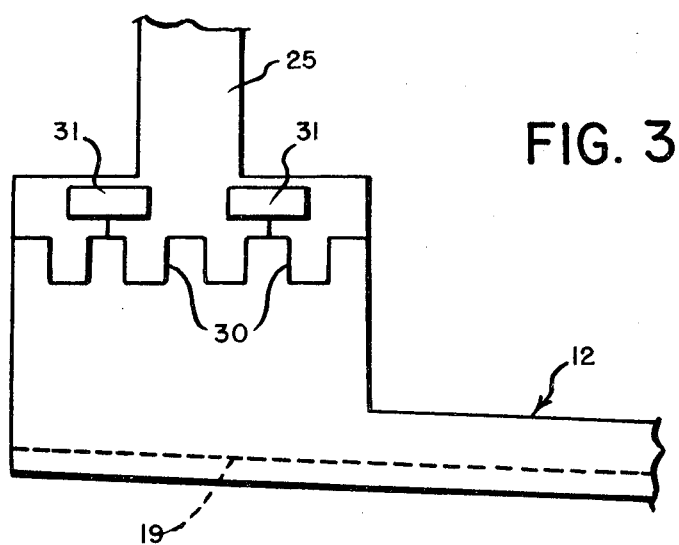
FIG. 3 is a side elevational view of a modified embodiment of the non-fluidized filtering structure shown in FIG. 1.

FIG. 3 shows a modified embodiment of the present invention in which the filtering structure of the filtering section 11 as shown in FIG. 1 is replaced by conventional bag filters 30. The exterior surfaces of the bag filters facing the underlying fluidized bed of alumina are adapted to collect alumina and, in particular, alumina dust rising from the fluidized bed. The alumina as deposited on these filters provides a plurality of filtering layers through which the effluent from the fluidized bed must pass. The filtering of effluent in this manner requires periodic removal of the alumina collected on the filter bags and this is done by vibrating or impinging the bag filters with jets of air by suitable means indicated at 31. This procedure returns the alumina from the non-fluidized layers as collected on the bag filters to the fluidized bed of alumina lying below.

Figure 4:
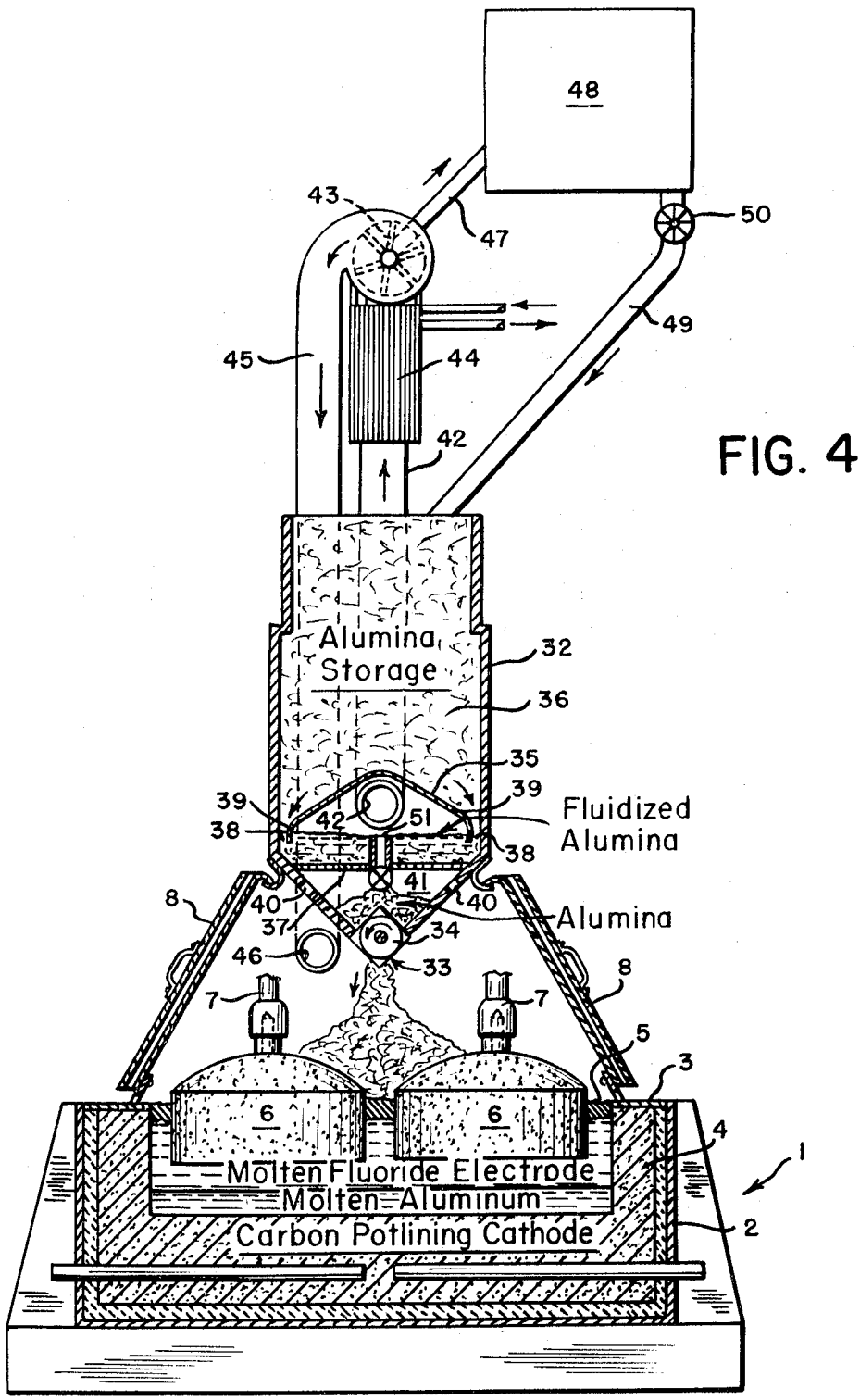
FIG. 4 is a side elevational view of a modified embodiment of the filtering system of the present invention.

FIG. 4 shows a modified embodiment of the filtering system of the present invention. In this embodiment, a storage receptacle 32 is disposed above the hood structure 8 with an outlet 33 at its lower end communicating with the enclosed area above the cell. Disposed within the outlet is a suitable regulating means 34 for feeding alumina from the receptacle to the cell as more fully described below.

Internally, the receptacle 32 includes an impervious intermediate first support member 35 spaced above the lower end of the receptacle for holding a supply 36 of alumina. The receptacle also includes a horizontally disposed pervious second support member 37 positioned between the lower end of the receptacle and the first support member. This second support member is adapted to contain a bed of fluidized alumina thereon. The alumina for this bed is received from the supply 36 through passage means 38 defined by spaced openings along opposite side walls of the receptacle 32. Baffle means 39 are provided at each opening 38 to effectively extend the first support member down to a point adjacent the second support member.

To permit movement of effluent through the fluidize bed, the bottom wall of the receptacle is provided with openings 40. These openings provide communication between the area enclosed by the hood structure 8 and the area 41 within the receptacle 32 immediately below the second support member. An exhaust duct 42 is disposed above the bed of alumina on the second support member for carrying effluent and air infiltrating into the hooded enclosure from the fluidized bed and out of the receptacle 32. A suitable aspirator, such as a fan 43 is disposed within the exhaust duct 42. The fan creates the necessary pressure differential to effect fluidization to the bed of alumina on the second support member and to draw the effluent into the duct 42. After the effluent passes through the fluidized bed of alumina and into the duct 42 it is drawn through a heat exchanger 44 where it is cooled. After the cooling, a portion of the effluent is directed into the duct 45. As shown in FIG. 4, the duct 45 connects with the area enclosed by the hood 8 through an opening 46 in the hood. Cooled effluent entering the area above the cell at this point is recycled through the fluidized bed of alumina.

The cooling of the effluent and directing it back into the area enclosed by the hood provides the added advantage of decreasing the amount of air that must be allowed to infiltrate into this area to provide the necessary volume for fluidizing the bed of alumina. Thus, the extent to which the effluent from the cell must be diluted before filtering is reduced and the filtering efficiency of the filtering apparatus thereby increased. In addition, the cooled effluent returned to the hooded area above the cell is low in oxygen. This effluent therefore reduces the surface burning of the anodes 6. Beyond to the advantages to the filtering system, the inclusion of the heat exchanger provides a supply of heat which may be used as a source of motive power by, for example, evaporating a volatile liquid such as water or sulfur dioxide, ammonia, ethyl or methyl chloride or the like.

In addition to recycling a portion of the cooled effluent through the fluidized bed, which portion may be that just sufficient to fluidize, a second portion of the cooled effluent is fed through a duct 47 and into a bin 48. Bin 48 is equipped with the same filtering apparatus used in the filtering section 11 of the embodiment shown in FIG. 1. The bin 48 is also provided with a return duct 49 for directing alumina from the bin to the supply of alumina 36. At the inlet to the duct 49 is a feeding means 50 for continuously or intermittently feeding the alumina into the duct 49. The alumina in the duct may be fed to the supply 36 by gravity or suitable positive feeding means.

WIth the recycling of a portion of the cooled effluent through the fluidized bed of alumina as described above, the system will, once in operation, effectively recycle nearly all effluent through the fluidized bed of alumina. The amount of effluent which is fed back into the area under the hood is determined by the total volume necessary to produce fluidization of the bed of alumina.

In addition to feeding the alumina from the secondary filtering structure back to the fluidized bed, the alumina in the fluidized bed together with the effluent contained therein is fed back to the cell. For this purpose a feed means comprising an overflow conduit 51 and the previously described regulating means 34 is provided. The conduit extends centrally upwardly through the bed of fluidized alumina to the upper level of the bed. The bottom end of this conduit directs alumina into the central bottom portion of the receptacle 32 in the area over the outlet 33. The regulating means 34 is controlled to either continuously or intermittently feed alumina from the outlet onto the crust of the cell below.

Although a utilization of this invention for the recovery of fluorides from aluminum reduction cells is described above, it is likewise possible to recover fluorides from effluent gases of other metallurgical operations such as fertilizer plants treating calcium fluoapatite. In this case limestone particles may be used between the baffled screens and in the fluidized bed instead of alumina and biproduct calcium fluoride manufactured.

I claim:

1. The method of treating effluent from an aluminum reduction cell during the electrolytic reduction of aluminum comprising the steps of:
   a. collecting the effluent from the cell;
   b. passing the effluent from the cell through a fluidized bed of alumina;
   c. passing the effluent from the fluidized bed through a non-fluidized layer of alumina; and
   d. feeding the alumina of both the non-fluidized layer and the fluidized bed with the effluent contained therein into the fusion of the aluminum reduction cell.

2. The method according to claim 1 including the steps of:
   a. feeding the fluidized bed along a predetermined path; and
   b. passing the effluent from the cell in a counter-current direction through the fluidized bed.

3. The method according to claim 1 including the steps of:
   a. providing a predetermined path for feeding of alumina from one elevation to a lower elevation;
   b. passing the effluent from the cell along said said predetermined path from said lower elevation to the higher elevation at a rate sufficient to fluidize said alumina, with the slope of said predetermined path being sufficient to feed said bed counter-current to the flow of effluent.

4. The method according to claim 1 including the steps of:
   a. feeding the non-fluidized layer of alumina with contained effluent to the fluidized bed; and
   b. feeding the alumina in the fluidized bed with the effluent contained therein into the fusion of the aluminum reduction cell.

5. The method according to claim 4 including the step of:
   a. passing the effluent from the cell through said fluidized bed under a reduced pressure.

6. The method according to claim 1 further comprising the step of:
   a. supplying additional alumina from a source separate from said fluidized bed of alumina to said non-fluidized layer as said layer is depleated.

7. The method according to claim 1 further comprising the steps of:
   a. providing a plurality of spaced non-fluidized layers of alumina; and
   b. confining the non-fluidized layers of alumina in a vertical orientation.

8. The method according to claim 1 including the step of:
   a. passing the effluent from the cell upwardly through a bed of alumina at a rate sufficient to fluidize the bed.

9. The combination with a cell for the electrolytic reduction of aluminum from fluoride fusions which comprises:
   a. a hood enclosing the upper part of the cell for collecting effluent from the cell;
   b. support means for carrying a bed of alumina in a fluidized state, said support means including a duct disposed at an angle to the horizontal for feeding alumina in a fluidized state downwardly therethrough and into said cell;
   c. filter means for holding a layer of alumina in a non-fluidized state; and
   d. feed means for feeding effluent from said cell through the fluidized bed of alumina and then through the layer of non-fluidized alumina, said feed means including suction means for feeding effluent from said cell upwardly through said duct at a rate sufficient to fluidize the alumina therein, said duct being sloped at an angle sufficient to permit the fluidized alumina therein to flow by gravity countercurrent to the effluent.

10. The combination according to claim 9 wherein said filter means includes:
    a. a structure at the upper end of said duct having supported therein a plurality of upright filters, each filter consisting of two walls providing a space therebetween for confining a layer of pulverulent alumina.

11. The combination according to claim 10 further comprising:
    a. a receptacle above the filters for holding a supply of alumina which feeds into and maintains the filters filled with alumina; and
    b. regulating means for feeding alumina from the bottom of the filters and into the upper end of said chute.

12. The combination with a cell for the electrolytic reduction of aluminum from fluoride fusions which comprises:
    a. a hood enclosing the upper part of the cell for collecting effluent from the cell;
    b. support means for carrying a bed of alumina in a fluidized state, said support means including a horizontally disposed pervious member for holding a bed of alumina;
    c. filter means for holding a layer of alumina in a non-fluidized state; and
    d. feed means for feeding effluent from said cell through the fluidized bed of alumina and then through the layer of non-fluidized alumina, said feeding means including means for creating a pressure differential on vertically opposite sides of said bed for feeding effluent upwardly through said bed at a rate sufficient to fluidize the alumina in the bed.

13. The combination according to claim 12 wherein:
    a. said filter means includes means for holding a plurality of vertically spaced layers of non-fluidized alumina for filtering the effluent from the fluidized bed of alumina.

14. The combination according to claim 13 further comprising:
    a. A heat exchanger for cooling effluent from the fluidized bed;
    b. first duct means for directing a first portion of the cooled effluent into the area above the cell enclosed by said hood for recycling through said fluidized bed of alumina;
    c. second duct means for directing a second portion of the cooled effluent to said filter mean; and
    d. suction producing means for drawing effluent through the fluidized bed and heat exchanger.

15. The combination according to claim 14 further comprising:
    a. means for feeding alumina from said filter means to said fluidized bed of alumina; and
    b. means for feeding alumina from said fluidized bed and into said cell.

16. The combination with a cell for the electrolytic reduction of aluminum from fluoride fusions which comprises:
    a. a hood enclosing the upper part of the cell for collecting effluent from the cell;
    b. support means for carrying a bed of alumina in a fluidized state, said support means including a storage receptacle disposed above said hood with an outlet at its lower end in communication with the area enclosed by said hood, said receptacle including:
       1. an impervious intermediate first support member spaced above the lower end of the receptacle for holding a supply of alumina thereabove,
       2. a horizontally disposed pervious second support member disposed between the lower end of said receptacle and said first support member for supporting a bed of fluidized alumina, and
       3. passage means connecting said supply of alumina with said bed of fluidized alumina;
    c. filter means for holding a layer of alumina in a non-fluidized state; and
    d. feed means for feeding effluent from said cell through the fluidized bed of alumina and then through the layer of non-fluidized alumina.

17. The combination according to claim 16 further comprising:
   a. an exhaust duct disposed above said bed and below said first support member for directing effluent from above said bed, out of said receptacle and toward said filter means; and
   b. first feed means for feeding alumina from said fluidized bed and into said cell; and
   c. second feed means for feeding alumina from said filter means to said supply of alumina.

18. The combination according to claim 17 further comprising
   a. a heat exchanged disposed in said exhaust duct for cooling effluent from said fluidized bed;
   b. a return duct for directing a first portion of the cooled effluent into the area above the cell enclosed by said hood for recycling through said fluidized bed of alumina; and
   c. an additional duct for directing a second portion of the cooled effluent to said filter means.

19. The combination according to claim 18 wherein:
   a. said passage means connecting said supply of alumina with said fluidized bed includes openings in the first support member along two opposite side walls of said receptacle;
   b. said first feed means includes:
      1. an overflow conduit extending centrally upwardly through said fluidized bed to the level of said bed, and
      2. regulating means at the outlet of said receptacle for feeding alumina received from said overflow conduit to said cell.

20. The method of treating effluent from an aluminum reduction cell during the electrolytic reduction of aluminum comprising the steps of:
   a. collecting the effluent from the cell;
   b. passing the effluent from the cell through a fluidized bed of alumina; and
   c. passing the effluent from the fluidized bed through a non-fluidized layer of alumina.

21. The method according to claim 20 including the step of:
   a. feeding the non-fluidized layer of alumina with the effluent contained therein to the fluidized bed.

22. The combination with a cell for the electrolytic reduction of aluminum from fluoride fusions which comprises:
   a. a hood enclosing the upper part of the cell for collecting effluent from the cell;
   b. support means for carrying a bed o alumina in a fluidized state;
   c. filter means for holding a layer of alumina in a non-fluidized state; and
   d. feed means for feeding effluent from said cell through the fluidized bed of alumina and then through the layer of non-fluidized alumina.

23. The method of treating effluent from an aluminum reduction cell during the electrolytic reduction of aluminum comprising the steps of:
   a. collecting the effluent from the cell;
   b. passing the effluent from the cell through a fluidized bed of alumina, said effluent being passed upwardly through a bed of alumina at a rate sufficient to fluidize it;
   c. passing the effluent from the fluidized bed through a non-fluidized layer of alumina;
   d. feeding the alumina of both the non-fluidized layer and the fluidized bed with the effluent contained therein into the fusion of the aluminum reduction cell;
   e. cooling the effluent from the fluidized bed;
   f. recycling a first portion of the cooled effluent through the fluidized bed; and
   g. passing a second portion of the cooled effluent through said non-fluidized layer of alumina.

* * * * *